United States Patent
Wang

(10) Patent No.: US 9,961,665 B2
(45) Date of Patent: May 1, 2018

(54) GPS SIGNAL ACQUISITION METHOD AND DISTRIBUTED BASE STATION

(71) Applicant: ZTE CORPORATION, Shenzhen (CN)

(72) Inventor: Ying Wang, Shenzhen (CN)

(73) Assignee: ZTE CORPORATION (CN)

( * ) Notice: Subject to any disclaimer, the term of this patent is extended or adjusted under 35 U.S.C. 154(b) by 0 days. days.

(21) Appl. No.: 15/325,213

(22) PCT Filed: Oct. 31, 2014

(86) PCT No.: PCT/CN2014/089982
§ 371 (c)(1),
(2) Date: May 2, 2017

(87) PCT Pub. No.: WO2015/154443
PCT Pub. Date: Oct. 15, 2015

(65) Prior Publication Data
US 2017/0257840 A1    Sep. 7, 2017

(30) Foreign Application Priority Data
Jul. 10, 2014 (CN) .......................... 2014 1 0326661

(51) Int. Cl.
*G01S 19/21* (2010.01)
*G01S 19/23* (2010.01)
(Continued)

(52) U.S. Cl.
CPC ........... *H04W 64/003* (2013.01); *G01S 19/21* (2013.01); *G01S 19/23* (2013.01); *H04W 56/001* (2013.01)

(58) Field of Classification Search
CPC ... H04W 64/003; H04W 56/001; G01S 19/21; G01S 19/23
See application file for complete search history.

(56) References Cited

U.S. PATENT DOCUMENTS

2004/0203865 A1* 10/2004 Krasner ............... H04B 7/2675
455/456.1
2007/0161385 A1* 7/2007 Anderson ............... G01S 19/03
455/502
(Continued)

FOREIGN PATENT DOCUMENTS

| CN | 101267251 | 9/2008 |
| CN | 102624512 | 8/2012 |
| CN | 103259607 | 8/2013 |

OTHER PUBLICATIONS

International Search Report for PCT/CN2014/089982, English Translation attached to original, Both completed by the Chinese Patent Office on Apr. 9, 2015, All together 5 Pages.

*Primary Examiner* — Qun Shen
(74) *Attorney, Agent, or Firm* — Plumsea Law Group, LLC

(57) ABSTRACT

A method for acquiring a Global Positioning System GPS signal and a distributed base station are provided. The method includes that: a GPS signal is received via a GPS receiving module on a Radio Remote Unit RRU of a distributed base station, herein the GPS signal includes a clock signal and location information; the RRU transmits the received clock signal and location information to a Building Base band Unit BBU of the distributed base station; And the BBU computes to obtain an optimal clock provided for all devices of the present base station to use according to the received clock signal, and stores the received location information.

12 Claims, 2 Drawing Sheets

(51) Int. Cl.
*H04W 64/00* (2009.01)
*H04W 56/00* (2009.01)

(56) References Cited

U.S. PATENT DOCUMENTS

| | | | | |
|---|---|---|---|---|
| 2009/0303112 | A1* | 12/2009 | Alizadeh-Shabdiz | G01S 5/0257 342/357.48 |
| 2011/0122769 | A1* | 5/2011 | Zhang | H04B 3/54 370/235 |
| 2011/0310941 | A1* | 12/2011 | Kenington | H04W 88/085 375/220 |
| 2012/0256789 | A1* | 10/2012 | Bull | G01S 5/0221 342/357.25 |
| 2013/0107808 | A1* | 5/2013 | He | H04W 56/001 370/328 |
| 2013/0154877 | A1 | 6/2013 | Hwang | |
| 2013/0308626 | A1* | 11/2013 | Feng | H04J 3/0638 370/350 |

* cited by examiner

GPS SIGNAL ACQUISITION METHOD AND DISTRIBUTED BASE STATION

CROSS-REFERENCE TO RELATED APPLICATION

This application is the U.S. national phase of PCT Application No. PCT/CN2014/089982 filed Oct. 31, 2014, which claims priority to Chinese Application No. 201410326661.3 filed Jul. 10, 2014, the disclosures of which are incorporated in their entirety by reference herein.

TECHNICAL FIELD

The present disclosure relates to the field of mobile communications, and more particularly to a method for acquiring a Global Positioning System GPS signal, and a distributed base station.

BACKGROUND

When a traditional base station device acquires a GPS signal, the GPS signal is transmitted to a Building Base band Unit BBU of a distributed base station by independently erecting a GPS antenna in a coaxial feeder mode. The BBU performs comprehensive processing on the GPS signal and then performs whole-network synchronization. The GPS signal acquisition mode will cause the problems that the lightning protection capacity is poor, and the mode is easy to be interfered, and an RRU cannot be positioned and an antenna installation position is not suitable to be too far.

In terms of lightning protection, since a GPS signal is transmitted by using a metal cable, such as a coaxial feeder and so on, and a GPS antenna has to be installed outdoors, the BBU is located indoors or inside a cabinet generally. The GPS antenna and the BBU are located in different lightning protection regions, and when devices in two different lightning protection regions are connected by using a metal cable, a lightning protection device must be additionally installed, so a GPS lightning protection device must be additionally installed at the BBU side. Adoption of the metal coaxial feeder and the additionally installed GPS lightning protection device will increase the system construction and maintenance costs. Fault points will be added to added parts, and the workload of post maintenance is increased.

In terms of interference, since a base station has only one GPS antenna under a traditional mode, the base station is easily interfered by surrounding environments including a natural environment and an electromagnetic environment. For example, when the base station is shielded by the shade of a tree in summer and a large-power electric device is started or passes through the base station, the reception of a GPS signal may be unstably, or even stars cannot be searched for.

In terms of RRU positioning, in the traditional mode, since the installation position of the GPS antenna is close to the BBU, but is not directly related to the position of the RRU, particularly when the RRU is away from the BBU (such as a long-distance chain network structure), accurate location information of the RRU is not easily obtained. Therefore, inconvenience in operation of maintenance staff is caused, and the labor and time costs are also increased.

In terms of a GPS antenna installation position, under the influence of a feeder loss, the installation position of the GPS antenna is restricted. The GPS antenna is usually installed only at a position away from the BBU within several decameters, and special installation pieces and space resources are needed, so inconvenience will be brought to design and construction.

SUMMARY

In view of the problems in the related art that a GPS signal acquisition mode is poor in lightning protection capacity and easy for a GPS signal to be interfered, and an RRU cannot be positioned and an antenna installation position cannot be too far, embodiments of the present disclosure is proposed to provide a method and system for acquiring a GPS signal.

An embodiment of the present disclosure provides a method for acquiring a GPS signal, including the following steps.

A GPS signal is received via a GPS receiving module on an RRU of a distributed base station, herein the GPS signal includes a clock signal and location information.

The RRU transmits the received clock signal and location information to a BBU of the distributed base station.

The BBU computes to obtain an optimal clock provided for all devices of the distributed base station to use according to the received clock signal, and stores the received location information.

In an exemplary example, the step that the BBU computes to obtain an optimal clock provided for all devices of the distributed base station to use according to the received clock signal includes the following step.

The BBU performs centralized analysis and computation on the received clock signal, eliminates or optimizes a clock signal with a large interference, and generates the optimal clock provided for all the devices of the distributed base station to use.

In an exemplary example, the above-mentioned method further includes the following steps.

The RRU receives the optimal clock fed back by the BBU, performs difference statistics on the reported clock signal and the optimal clock, and reports analysis data to the BBU.

When computing to obtain that a difference between the clock signal and the optimal clock is greater than or equal to a predetermined threshold value, the RRU reports alarm information to a network management system.

In an exemplary example, after the received location information is stored, the above-mentioned method further includes the following step.

The BBU uploads the location information to the network management system, and view the location information via the network management system, and output the location information via an interface.

In an exemplary example, the above-mentioned method further includes the following steps.

The BBU establishes a device location information database according to the location information. Herein, the device location information database is used for inquiring the location information of all the devices of the present base station according to the location information.

The BBU establishes a GPS inquiry database according to clock information fed back by each RRU and a specification of the GPS receiving module used by the RRU. Herein, the GPS inquiry database is used for judging the performances of various GPS receiving modules according to the specification of the GPS receiving module used by the RRU and the clock information fed back by the RRU.

The embodiment of the present disclosure also provides a distributed base station for acquiring a GPS signal, including:

an RRU and a BBU.

The RRU is arranged to receive a GPS signal via a GPS receiving module provided on the RRU. Herein, the GPS signal including a clock signal and location information. The RRU is arranged to transmit the received clock signal and location information to the BBU.

The BBU is arranged to compute to obtain an optimal clock provided for all devices of the distributed base station to use according to the received clock signal, and store the received location information.

In an exemplary example, the above-mentioned BBU is arranged to perform centralized analysis and computation on the received clock signal, eliminate or optimize a clock signal with a large interference, and generate the optimal clock provided for all the devices of the distributed base station to use.

In an exemplary example, the above-mentioned RRU is further arranged to receive the optimal clock fed back by the BBU, perform difference statistics on the reported clock signal and the optimal clock, and report analysis data to the BBU; and when computing to obtain that a difference between the clock signal and the optimal clock is greater than or equal to a predetermined threshold value, report alarm information to a network management system.

In an exemplary example, the above-mentioned BBU is further arranged to, after the received location information is stored, upload the location information to the network management system, view the location information via the network management system, and output the location information via an interface.

In an exemplary example, the above-mentioned BBU is further arranged to, establish a device location information database according to the location information, herein the device location information database is used for inquiring the location information of all the devices of the present base station according to the location information; and establish a GPS inquiry database according to clock information fed back by the RRU and a specification of the GPS receiving module used by the RRU. Herein, the GPS inquiry database is used for judging a performance of the GPS receiving module according to the specification of the GPS receiving module used by each RRU and the clock information fed back by the RRU.

The embodiment of the present disclosure also provides a computer program, including a program instruction. When the program instruction is executed by the distributed base station, the above-mentioned method may be executed by the distributed base station.

The embodiment of the present disclosure also provides a computer-readable storage medium carrying the computer program.

By means of the technical solution of embodiments of the present disclosure, the problems in the related art that the GPS signal acquisition mode is poor in lightning protection capacity and easy for a GPS signal to be interfered, and the RRU cannot be positioned and the antenna installation position cannot be too far are solved, the GPS signal can be conveniently acquired, and the installation process is simplified, thereby reducing the material cost, and decreasing the quantity of possible system fault points.

The above-mentioned description is only the summary of the technical solution of the present disclosure. To be capable of more clearly understand the technical means of the present disclosure, the technical means may be implemented in accordance with the content of the specification. Moreover, to make the above-mentioned and other aims, characteristics and advantages understandable more obviously, specific embodiments of the present disclosure will be specifically illustrated.

BRIEF DESCRIPTION OF DRAWINGS

By reading detailed descriptions of alternative embodiments hereinafter, various other advantages and benefits will be clearer to those ordinary skilled in the art. The accompanying drawings are only intended to show the alternative embodiments and not regarded as limitations to the present disclosure. Moreover, in the whole accompanying drawings, identical parts are represented by using identical reference symbols. In the accompanying drawings.

DETAILED DESCRIPTION

Exemplary embodiments of the present disclosure will be described herein below with reference to the accompanying drawings in more detail. Although the exemplary embodiments of the present disclosure are displayed in the accompanying drawings, it should be understood that the present disclosure may be implemented in various forms and should not be limited by the embodiments elaborated herein. On the contrary, these embodiments are provided to more thoroughly understand the present disclosure, and the scope of the present disclosure can be completely delivered to those skilled in the art.

To solve the problems in the related art that a GPS signal acquisition mode is poor in lightning protection capacity and easy for a GPS signal to be interfered, and an RRU cannot be positioned and an antenna installation position cannot be too far, embodiments of the present disclosure provide a method for acquiring a GPS signal by using an RRU of a distributed base station, and the distributed base station. A GPS satellite signal is received by using a GPS receiving module assembled on the RRU. GPS clock signals received by a plurality of RRUs are transmitted to a BBU via an optical fiber. The BBU performs centralized analysis and computation on multi-path input GPS clocks, and signals with large interferences are eliminated or optimized by means of an algorithm, and clock signals used by the present base station are generated, and are provided for the BBU and the RRU to use. Difference statistics may be performed on clock data reported by the RRU and clock data fed back to the RRU by the BBU, and analysis data may be reported. When the difference therebetween exceeds a certain threshold value, an alarm may be reported to a network manager. The location information of the plurality of RRUs is transmitted to the BBU via an optical fiber, and then uploaded to a network management system via the transmission of the base station. The network management system may view RRU location information at any time and support centralized output in a report mode. The present disclosure is further described in detail hereinbelow in combination with the accompanying drawings and the embodiments. It should be understood that specific embodiments described herein are only intended to explain the present disclosure, and do not limit the present disclosure. The embodiments of the present disclosure and the characteristics in the embodiments may be randomly combined without conflicts.

Method Embodiment

Figure 1:
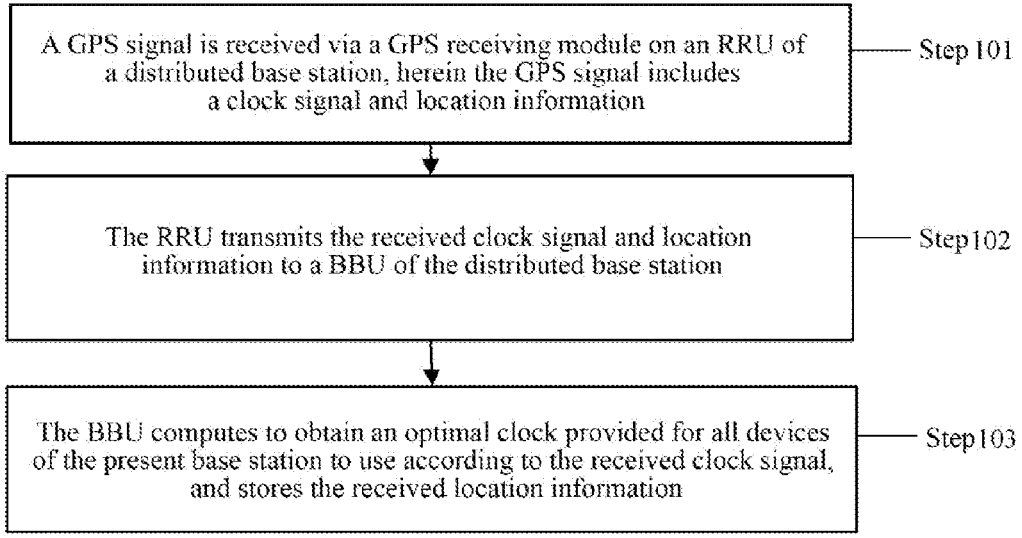
FIG. 1 is a flowchart of a method for acquiring a GPS signal according to an embodiment of the present disclosure.

According to an embodiment of the present disclosure, a method for acquiring a GPS signal is provided. FIG. 1 is a flowchart of a method for acquiring a GPS signal according to an embodiment of the present disclosure. As shown in FIG. 1, the method for acquiring a GPS signal according to the embodiment of the present disclosure includes the following processing.

In step 101, a GPS signal is received via a GPS receiving module on an RRU of a distributed base station. Herein, the GPS signal includes a clock signal and location information. In practical application, the GPS receiving module may be integrated inside the RRU, or may be externally connected, and may be assembled as required.

In step 102, the RRU transmits the received clock signal and location information to a BBU of the distributed base station.

In step 103, by computation, the BBU computes to obtain an optimal clock provided for all devices of the present base station to use according to the received clock signal, and stores the received location information.

In Step 103, the step that by computation, the BBU computes to obtain an optimal clock provided for all the devices of the present base station to use according to the received clock signal includes that: the BBU performs centralized analysis and computation on the received clock signal, eliminates or optimizes a clock signal with a large interference which is greater than a threshold value, and generates the optimal clock provided for all the devices of the present base station to use.

Those skilled in the art may understand that an optimal clock may be generated by means of a digital clock synchronization circuit comparison manner, an atomic clock comparison manner, a multi-path clock comparison manner, a local crystal oscillator comparison manner and the like, an offset clock and the optimal clock are synchronously calibrated by using a digital circuit such as a phase-locked ring and so on.

Herein, a clock capable of meeting the requirement for system clock synchronization precision may be called as the optimal clock. When a system has a plurality of clock signal sources meeting the requirement for precision, any one may be selected as a clock source. A 'reference clock' of the system may also be formed by means of a certain algorithm such as a weighing mode, a mid-value calculating mode and the like, the clock signal is allocated to various network elements in the system via a transmission system or used for clock calibration of various network elements. In a word, how to generate the optimal clock is easily implemented by those skilled in the art according to the common knowledge of the present field, and is not limited by the present disclosure.

After the above-mentioned processing, the RRU receives the optimal clock fed back by the BBU, performs difference statistics on the reported clock signal and the optimal clock, and reports analysis data to the BBU. When computing to obtain that the difference between the clock signal and the optimal clock is greater than or equal to a predetermined threshold value, the RRU reports alarm information to a network management system.

After the received location information is stored, the BBU may also upload the location information to the network management system. The location information may be viewed via the network management system. The location information may be output via an interface.

Besides, the BBU may also establish a device location information database according to the location information. Herein, the device location information database is used for inquiring the location information of all the devices of the present base station according to the location information.

The BBU may also establish a GPS inquiry database according to clock information fed back by various RRUs and specifications of the GPS receiving modules used by various RRUs. Herein, the GPS inquiry database is used for judging the performances of various GPS receiving modules according to the specifications of the GPS receiving modules used by various RRUs and the clock information fed back by various RRUs.

The above-mentioned technical solution of the embodiment of the present disclosure is elaborated hereinbelow in combination with the accompanying drawings and specific embodiments.

Figure 2:
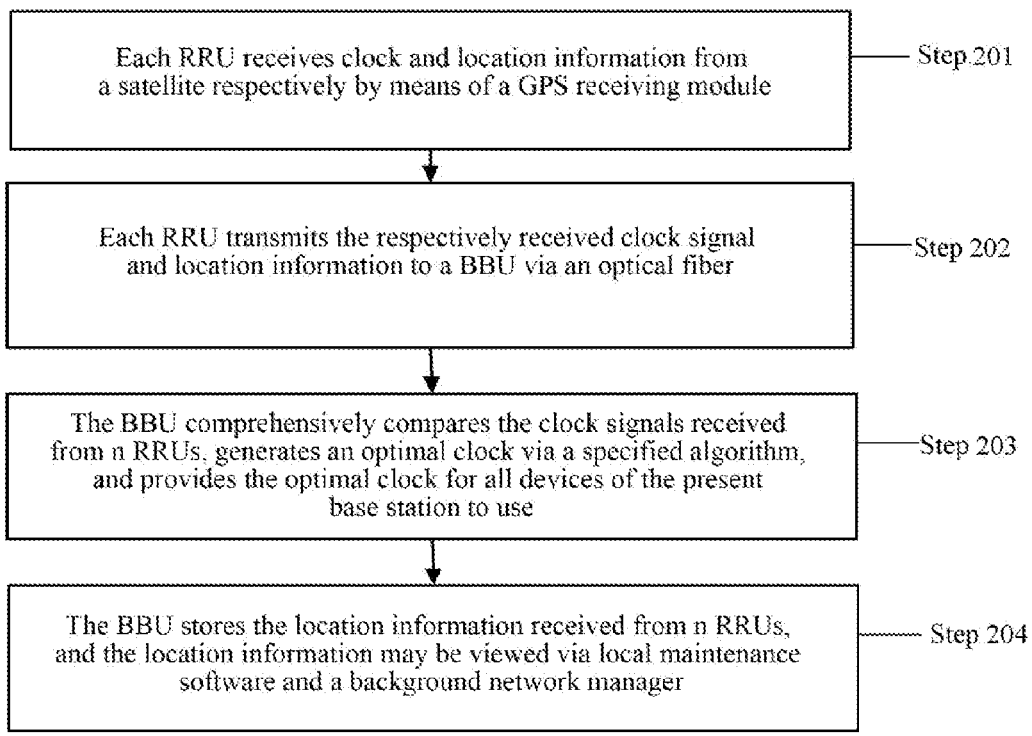
FIG. 2 is a schematic diagram of detailed processing of a method for acquiring a GPS signal by a base station according to an embodiment of the present disclosure.

FIG. 2 is a schematic diagram of detailed processing of a method for acquiring a GPS signal by a base station according to an embodiment of the present disclosure. As shown in FIG. 2, the method includes the following steps.

In step 201, each RRU receives clock and location information from a satellite respectively by means of a GPS receiving module.

In step 202, each RRU transmits the respectively received clock signal and location information to a BBU via an optical fiber.

In step 203, the BBU comprehensively compares the clock signals received from n RRUs, generates an optimal clock via a specified algorithm, and provides the optimal clock for all devices of the present base station to use.

In an exemplary example, it is judged whether the performances of various GPS receivers are good or bad by acquiring the sensitivity information of different brands, specifications and batches of GPS receivers and analyzing an offset to a whole-network synchronization clock.

In step 204, the BBU stores the location information received from n RRUs, and the location information may be viewed via local maintenance software and a background network manager.

In an exemplary example, the above-mentioned location information may be analyzed by the network manager to form a statistic report, and may be inquired in multiple dimensions. The dimensions include: longitude, latitude, height, and an administrative region to which the location belongs, which can be displayed on a base station distribution map of a network management interface in real time.

That is, in practical application, difference statistics may be performed on clock data reported by the RRU and clock data fed back to the RRU by the BBU, and analysis data may be reported. When the difference therebetween exceeds a certain threshold value, an alarm may be reported to the network manager. The location information of a plurality of RRUs is transmitted to the BBU via an optical fiber, and then uploaded to a network management system via the transmission of the base station. The network management system may view RRU location information at any time and support centralized output in a report mode.

In the technical solution of the embodiment of the present disclosure, during acquisition of a GPS clock, multi-path GPS signal input is adopted, which ensures, by means of an algorithm, that a base station system uses an optimal clock.

A method for inputting only one path of GPS signal in the related art is abandoned. Therefore, the stability and interference resistance of a system clock are effectively improved. Besides, during acquisition of location information of the base station, a mode that each RRU provides independent location information is adopted, and a method that the base station system only provides the location of the BBU and cannot provide the location information of the RRU is abandoned. The technical solution of the embodiment of the present disclosure contains possible indeterminacy caused by interference, shielding, poor device and the like, and by means of a multi-path input optimal algorithm, ensures that the system clock is in an optimal state. Moreover, GPS signal transmission in the technical solution of the embodiment of the present disclosure mainly adopts optical fiber transmission, and a feeder mode is no longer used, thereby solving the problems of short feeder transmission distance, easily suffering electromagnetic interference such as lightning interference and the like. A GPS signal lightning arrester is no longer used, thereby reducing the material cost.

Product Embodiment

Figure 3:
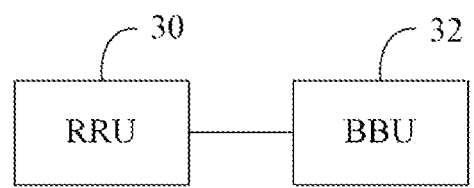
FIG. 3 is a structure diagram of a distributed base station according to an embodiment of the present disclosure.

According to an embodiment of the present disclosure, a distributed base station is provided. FIG. 3 is a structure diagram of a distributed base station according to an embodiment of the present disclosure. As shown in FIG. 3, the distributed base station of the embodiment of the present disclosure includes: an RRU 30 and a BBU 32. Each module of the embodiment of the present disclosure is elaborated hereinbelow.

The RRU 30 is arranged to receive a GPS signal via a GPS receiving module provided thereon, herein the GPS signal includes a clock signal and location information; and transmit the received clock signal and location information to the BBU 32 of the distributed base station. In an exemplary example, the above-mentioned RRU 30 is further arranged to receive the optimal clock fed back by the BBU 32, perform difference statistics on the reported clock signal and the optimal clock, and report analysis data to the BBU 32; and when computing to obtained that the difference between the clock signal and the optimal clock is greater than or equal to a predetermined threshold value, report alarm information to a network management system.

The BBU 32 is arranged to compute to obtain an optimal clock provided for all devices of the present base station to use according to the received clock signal, and store the received location information.

The above-mentioned BBU 32 is arranged to, perform centralized analysis and computation on the received clock signal, eliminate or optimize a clock signal with a large interference, and generate the optimal clock provided for all the devices of the present base station to use.

After the received location information is stored, the location information is uploaded to the network management system, and the location information is viewed via the network management system, and the location information is output via an interface.

A device location information database is established according to the location information. Herein, the device location information database is used for inquiring the location information of all the devices of the present base station according to the location information.

A GPS inquiry database is established according to clock information fed back by the RRU 30 and a specification of the GPS receiving module used by the RRU 30. Herein, the GPS inquiry database is used for judging a performance of the GPS receiving module according to the specification of the GPS receiving module used by the RRU 30 and the clock information fed back by the RRU 30.

In conclusion, by means of the technical solution of embodiments of the present disclosure, the problems in the related art that the GPS signal acquisition mode is poor in lightning protection capacity and easy for a GPS signal to be interfered, and the RRU cannot be positioned and the antenna installation position cannot be too far are solved. The GPS signal can be conveniently acquired, and the installation process is simplified, thereby reducing the material cost, and decreasing the quantity of possible system fault points.

Those skilled in the art may make various modifications and transformations on the present disclosure without departing from the essence and scope of the present disclosure. Thus, if these modifications and transformations of the present disclosure fall within the scope of claims of the present disclosure and an equivalent technology thereof, the present disclosure is also intended to include these modifications and transformations.

Those ordinary skilled in the art may understand that all or some of the steps of the above-mentioned embodiment may be implemented by using a computer program flow. The computer program may be stored in a computer-readable storage medium. The computer program is executed on a corresponding hardware platform (such as system, equipment, apparatus, and device). During execution, the computer program includes one of the steps of the method embodiment or a combination thereof.

Alternatively, all or some of the steps of the above-mentioned embodiment may also be implemented by using an integrated circuit. These steps may be manufactured into integrated circuit modules respectively, or a plurality of modules or steps therein are manufactured into a single integrated circuit module. Thus, the present disclosure is not limited to a combination of any specific hardware and software.

Each apparatus/functional module/function unit in the above-mentioned embodiment may be implemented by using a general computation apparatus. They may be centralized on a single computation apparatus or may be distributed on a network composed of a plurality of computation apparatuses.

When each apparatus/functional module/function unit in the above-mentioned embodiment is implemented in a form of a software function module and is sold or used as an independent product, the product may also be stored in a computer-readable storage medium. The above-mentioned computer-readable storage medium may be a read-only memory, a magnetic disk or an optical disk or the like.

Any person skilled in the art may easily conceive variations or replacements within the disclosed technical scope of the present disclosure. These variations or replacements should fall within the scope of protection of the present disclosure. Thus, the scope of protection of the present disclosure should refer to the scope of protection of the claims.

INDUSTRIAL APPLICABILITY

According to the embodiment of the present disclosure, the GPS signal can be conveniently acquired, and the installation process is simplified, thereby reducing the material cost, and decreasing the quantity of possible system fault points.

I claim:

1. A method for acquiring a Global Positioning System, GPS, signal, comprising:
   receiving a GPS signal via a GPS receiving module on a Radio Remote Unit, RRU, of a distributed base station, wherein the GPS signal comprises a clock signal and location information;
   transmitting, by the RRU, the received clock signal and location information to a Building Base band Unit, BBU, of the distributed base station; and
   computing, by the BBU, to obtain an optimal clock provided for all devices of the distributed base station to use according to the received clock signal, and storing the received location information;
   establishing, by the BBU, a device location information database according to the location information, wherein the device location information database is used for inquiring the location information of all devices of the distributed base station according to the location information; and
   establishing, by the BBU, a GPS inquiry database according to the clock information fed back by the RRU and a specification of the GPS receiving module used by the RRU, wherein the GPS inquiry database is used for judging a performance of the GPS receiving module according to the specification of the GPS receiving module used by the RRU and the clock information fed back by the RRU.

2. The method according to claim 1, wherein, computing, by the BBU, to obtain an optimal clock provided for all devices of the distributed base station to use according to the received clock signal comprises:
   performing, by the BBU, centralized analysis and computation on the received clock signal, eliminating or optimizing a clock signal with a large interference, and generating the optimal clock provided for all devices of the distributed base station to use.

3. The method according to claim 1, further comprising:
   receiving, by the RRU, the optimal clock fed back by the BBU, performing difference statistics on the reported clock signal and the optimal clock, and reporting analysis data to the BBU; and
   reporting, by the RRU, alarm information to a network management system when computing to obtain that a difference between the clock signal and the optimal clock is greater than or equal to a predetermined threshold value.

4. The method according to claim 1, wherein after storing the received location information, the method further comprises:
   uploading, by the BBU, the location information to a network management system, viewing the location information via the network management system, and outputting the location information via an interface.

5. A distributed base station, comprising a Radio Remote Unit, RRU, and a Building Base band Unit, BBU, wherein
   the RRU is arranged to receive a Global Positioning System, GPS, signal via a GPS receiving module provided on the distributed base station, wherein the GPS signal comprises a clock signal and location information; and transmit the received clock signal and location information to the BBU; and
   the BBU is arranged to compute to obtain an optimal clock provided for all devices of the distributed base station to use according to the received clock signal, and store the received location information;
   the BBU is further arranged to, establish a device location information database according to the location information, wherein the device location information database is used for inquiring the location information of all devices of the present base station according to the location information; and, establish a GPS inquiry database according to the clock information fed back by the RRU and a specification of the GPS receiving module used by the RRU, wherein the GPS inquiry database is used for judging a performance of the GPS receiving module according to the specification of the GPS receiving module used by the RRU and the clock information fed back by the RRU.

6. The distributed base station according to claim 5, wherein the BBU is arranged to perform centralized analysis and computation on the received clock signal, eliminate or optimize a clock signal with a large interference, and generate the optimal clock provided for all devices of the distributed base station to use.

7. The distributed base station according to claim 5, wherein the RRU is further arranged to receive the optimal clock fed back by the BBU, perform difference statistics on the reported clock signal and the optimal clock, and report analysis data to the BBU; and when computing to obtain that a difference between the clock signal and the optimal clock is greater than or equal to a predetermined threshold value, report alarm information to a network management system.

8. The distributed base station according to claim 5, wherein the BBU is further arranged to, after the received location information is stored, upload the location information to a network management system, and view the location information via the network management system, and output the location information via an interface.

9. A non-transitory computer-readable storage medium carrying a computer program, wherein the computer program comprises a program instruction, and when the program instruction is executed by a distributed base station, the distributed base station is configured to execute a method for acquiring a Global Positioning System, GPS, signal,
   wherein the method comprises:
   receiving a GPS signal via a GPS receiving module on a Radio Remote Unit, RRU, of a distributed base station, wherein the GPS signal comprises a clock signal and location information;
   transmitting, by the RRU, the received clock signal and location information to a Building Base band Unit, BBU, of the distributed base station; and
   computing, by the BBU, to obtain an optimal clock provided for all devices of the distributed base station to use according to the received clock signal, and storing the received location information;
   establishing, by the BBU, a device location information database according to the location information, wherein the device location information database is used for inquiring the location information of all devices of the distributed base station according to the location information; and
   establishing, by the BBU, a GPS inquiry database according to the clock information fed back by the RRU and a specification of the GPS receiving module used by the RRU, wherein the GPS inquiry database is used for judging a performance of the GPS receiving module according to the specification of the GPS receiving module used by the RRU and the clock information fed back by the RRU.

10. A non-transitory computer-readable storage medium carrying a computer program, wherein the computer program comprises a program instruction, when the program instruction is executed by a distributed base station, the distributed base station is configured to execute a method for acquiring a Global Positioning System, GPS, signal,
wherein the method comprises:
receiving a GPS signal via a GPS receiving module on a Radio Remote Unit, RRU, of a distributed base station, wherein the GPS signal comprises a clock signal and location information;
transmitting, by the RRU, the received clock signal and location information to a Building Base band Unit, BBU, of the distributed base station; and
computing, by the BBU, to obtain an optimal clock provided for all devices of the distributed base station to use according to the received clock signal, and storing the received location information, comprising: performing, by the BBU, centralized analysis and computation on the received clock signal, eliminating or optimizing a clock signal with a large interference, and generating the optimal clock provided for all devices of the distributed base station to use;
establishing, by the BBU, a device location information database according to the location information, wherein the device location information database is used for inquiring the location information of all devices of the distributed base station according to the location information; and
establishing, by the BBU, a GPS inquiry database according to the clock information fed back by the RRU and a specification of the GPS receiving module used by the RRU, wherein the GPS inquiry database is used for judging a performance of the GPS receiving module according to the specification of the GPS receiving module used by the RRU and the clock information fed back by the RRU.

11. A non-transitory computer-readable storage medium carrying a computer program, wherein the computer program comprises a program instruction, when the program instruction is executed by a distributed base station, the distributed base station is configured to execute a method for acquiring a Global Positioning System, GPS, signal,
wherein the method comprises:
receiving a GPS signal via a GPS receiving module on a Radio Remote Unit, RRU, of a distributed base station, wherein the GPS signal comprises a clock signal and location information;
transmitting, by the RRU, the received clock signal and location information to a Building Base band Unit, BBU, of the distributed base station; and
computing, by the BBU, to obtain an optimal clock provided for all devices of the distributed base station to use according to the received clock signal, and storing the received location information;
establishing, by the BBU, a device location information database according to the location information, wherein the device location information database is used for inquiring the location information of all devices of the distributed base station according to the location information; and
establishing, by the BBU, a GPS inquiry database according to the clock information fed back by the RRU and a specification of the GPS receiving module used by the RRU, wherein the GPS inquiry database is used for judging a performance of the GPS receiving module according to the specification of the GPS receiving module used by the RRU and the clock information fed back by the RRU;
the method further comprises:
receiving, by the RRU, the optimal clock fed back by the BBU, performing difference statistics on the reported clock signal and the optimal clock, and reporting analysis data to the BBU; and
reporting, by the RRU, alarm information to a network management system when computing to obtain that a difference between the clock signal and the optimal clock is greater than or equal to a predetermined threshold value.

12. A non-transitory computer-readable storage medium carrying a computer program, wherein the computer program comprises a program instruction, when the program instruction is executed by a distributed base station, the distributed base station is configured to execute a method for acquiring a Global Positioning System, GPS, signal,
wherein the method comprises:
receiving a GPS signal via a GPS receiving module on a Radio Remote Unit, RRU, of a distributed base station, wherein the GPS signal comprises a clock signal and location information;
transmitting, by the RRU, the received clock signal and location information to a Building Base band Unit, BBU, of the distributed base station; and
computing, by the BBU, to obtain an optimal clock provided for all devices of the distributed base station to use according to the received clock signal, and storing the received location information;
establishing, by the BBU, a device location information database according to the location information, wherein the device location information database is used for inquiring the location information of all devices of the distributed base station according to the location information; and
establishing, by the BBU, a GPS inquiry database according to the clock information fed back by the RRU and a specification of the GPS receiving module used by the RRU, wherein the GPS inquiry database is used for judging a performance of the GPS receiving module according to the specification of the GPS receiving module used by the RRU and the clock information fed back by the RRU;
wherein after storing the received location information, the method further comprises:
uploading, by the BBU, the location information to a network management system, viewing the location information via the network management system, and outputting the location information via an interface.

* * * * *